Patented July 6, 1926.

1,591,196

UNITED STATES PATENT OFFICE.

HANS WEIDMANN, OF FRANKFORT-ON-THE-MAIN, GERMANY, ASSIGNOR TO ALLIED PROCESS CORPORATION, OF NEW YORK, N. Y., A CORPORATION OF NEW YORK.

PROCESS OF RECOVERING LITHIUM SALTS FROM PHOSPHATE MINERALS CONTAINING LITHIUM.

No Drawing. Application filed November 24, 1924, Serial No. 752,034, and in Germany December 12, 1923.

It is old practice to decompose silicates containing lithium, for instance lepidolite etc. by means of alkali metal sulphates; it also has been proposed to glow (calcine) lithium-containing phosphates, e. g. amblygonite, in the presence of acid sodium sulphate to render the lithium water-soluble. In both cases the finely pulverized mineral is mixed with the salt and heated to a temperature which lies below the sintering point and consequently far below the melting point.

It has now been found that neutral alkali metal sulphates are capable of quantitatively decomposing lithium minerals containing phosphorus such as amblygonite, triphylite, etc. The new process based upon this discovery represents a material step forward as compared with the old processes, since heating of for example potassium sulphate and amblygonite gives a readily fusible melt even at a dark red heat. The liquid phase of the reacting materials facilitates the decomposition as compared with the solid phase involved in the old processes. The heretofore necessary step of finely pulverizing the minerals is eliminated. The liquid product of reaction can be easily chilled by means of water and the lithium sulphate readily extracted.

This action of neutral alkali metal sulphates upon phosphates containing lithium could not be foreseen, although it was old practice to treat silicates in a similar manner. Phosphates and silicates are ordinarily not chemical equivalents, the composition of the two classes of minerals being entirely different. The phosphates contain of the alkali group only the element lithium, whereas the silicates contain also sodium or potassium or both.

The prior method of decomposing lithium minerals by means of sodium disulphate is chemically entirely different from the invention. The bisulphate is used as a substitute for the sulphuric acid heretofore used and its action is essentially that of an acid, whereas the invention deals with a neutral reagent.

Example.—Equal parts of amblygonite and potassium sulphate are heated to melting temperature. The liquid product of reaction is then chilled with water and systematically lixiviated. The solution containing only potassium and lithium sulphates is then further treated in well known manner for the production of lithium by separating out the excess of potassium sulphate by means of fractional crystallization and precipitating from the mother liquor the lithium, for instance, as carbonate. The recovery of the lithium is technically quantitative. The regenerated potassium sulphate can be utilized for a new decomposition.

I claim:

1. Process of recovering lithium salts from phosphate minerals containing lithium, which consists in heating the ore in the presence of a potassium sulphate until melting is effected and recovering lithium sulphate from the melt.

2. In a process of recovering lithium salts from phosphate minerals containing lithium, the step which consists in heating the ore in the presence of a neutral alkali metal sulphate until melting is effected.

In testimony whereof, I affix my signature.

DR. HANS WEIDMANN.